United States Patent
Perez et al.

(10) Patent No.: US 8,534,891 B2
(45) Date of Patent: Sep. 17, 2013

(54) LUMINOUS PLATE

(75) Inventors: Sylvie Perez, Asnieres (FR); Yves Benkemoun, Rueil-Malmaison (FR); Patrick Truquin, Senlis (FR); Andre Rivaud, Vaires-sur-Marne (FR)

(73) Assignee: BPB Limited, Coventry (GB)

( * ) Notice: Subject to any disclaimer, the term of this patent is extended or adjusted under 35 U.S.C. 154(b) by 0 days.

(21) Appl. No.: 13/129,548

(22) PCT Filed: Nov. 17, 2009

(86) PCT No.: PCT/FR2009/001313
§ 371 (c)(1),
(2), (4) Date: Aug. 3, 2011

(87) PCT Pub. No.: WO2010/058095
PCT Pub. Date: May 27, 2010

(65) Prior Publication Data
US 2011/0280041 A1    Nov. 17, 2011

(30) Foreign Application Priority Data
Nov. 18, 2008 (FR) .................................... 08 06452

(51) Int. Cl.
*F21V 7/04* (2006.01)

(52) U.S. Cl.
USPC ........................................... 362/551; 362/84

(58) Field of Classification Search
USPC ................ 362/606, 610, 616, 632–634, 581, 362/551, 554, 382, 436, 457, 458, 84, 34
See application file for complete search history.

(56) References Cited

U.S. PATENT DOCUMENTS

| | | | | |
|---|---|---|---|---|
| 3,089,211 A | * | 5/1963 | Perusse | 24/556 |
| 4,234,907 A | * | 11/1980 | Daniel | 362/556 |
| 4,862,659 A | * | 9/1989 | Wilson et al. | 174/499 |
| 5,021,928 A | * | 6/1991 | Daniel | 362/556 |
| 5,136,480 A | * | 8/1992 | Pristash et al. | 362/618 |
| 5,568,964 A | * | 10/1996 | Parker et al. | 362/556 |
| 6,030,089 A | * | 2/2000 | Parker et al. | 362/103 |

(Continued)

FOREIGN PATENT DOCUMENTS

| | | |
|---|---|---|
| DE | 102 06 613 A1 | 8/2003 |
| FR | 2 808 473 A1 | 11/2001 |
| FR | 2 859 737 A1 | 3/2005 |
| FR | 2 887 996 A1 | 1/2007 |
| FR | 2 907 194 A1 | 4/2008 |
| FR | 2 909 159 A1 | 5/2008 |
| WO | 2004/057079 A1 | 7/2004 |
| WO | 2008/035010 A1 | 3/2008 |

OTHER PUBLICATIONS

International Search Report, dated Jan. 7, 2010, from corresponding PCT application.

*Primary Examiner* — Julie Shallenberger
(74) *Attorney, Agent, or Firm* — Young & Thompson

(57) ABSTRACT

This board is a complex including a rigid support covered with a luminous fabric. The rigid support has a front face, a rear face, a first edge, and a second edge opposite the first edge. The luminous fabric at least partly covers the front face of the rigid support, extending from the first edge toward the second edge, and includes optical fibers extending over the front face of the rigid support substantially perpendicular to the first edge and the second edge. First ends of the optical fibers are bent around the first edge toward the rear face of the rigid support, and a gripping element are provided on the first edge and form a clamp for gripping the bent parts of the optical fibers and the first edge of the rigid support.

20 Claims, 3 Drawing Sheets

(56) References Cited

U.S. PATENT DOCUMENTS

Figure 3:
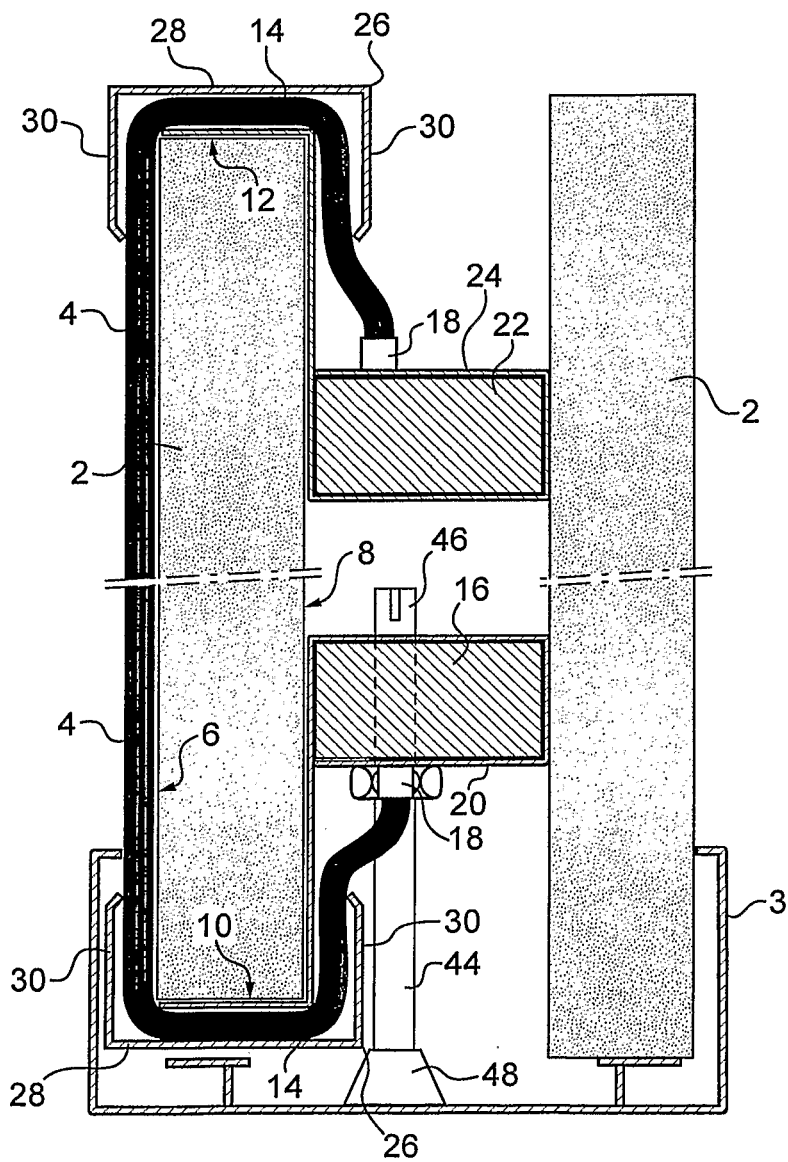

| | | | | |
|---|---|---|---|---|
| 6,361,180 B1 | * | 3/2002 | Iimura | 362/616 |
| 6,628,885 B1 | * | 9/2003 | Wilkie et al. | 385/147 |
| 7,300,194 B2 | * | 11/2007 | Parker | 362/619 |
| 7,479,664 B2 | * | 1/2009 | Williams | 257/98 |
| 2004/0174715 A1 | * | 9/2004 | Page et al. | 362/554 |
| 2006/0087864 A1 | | 4/2006 | Peng et al. | |
| 2006/0144460 A1 | | 7/2006 | Brochier et al. | |
| 2007/0281155 A1 | | 12/2007 | Tao et al. | |
| 2008/0198620 A1 | | 8/2008 | Bihr et al. | |
| 2009/0291606 A1 | | 11/2009 | Malhomme et al. | |
| 2010/0046246 A1 | | 2/2010 | Bihr et al. | |

* cited by examiner

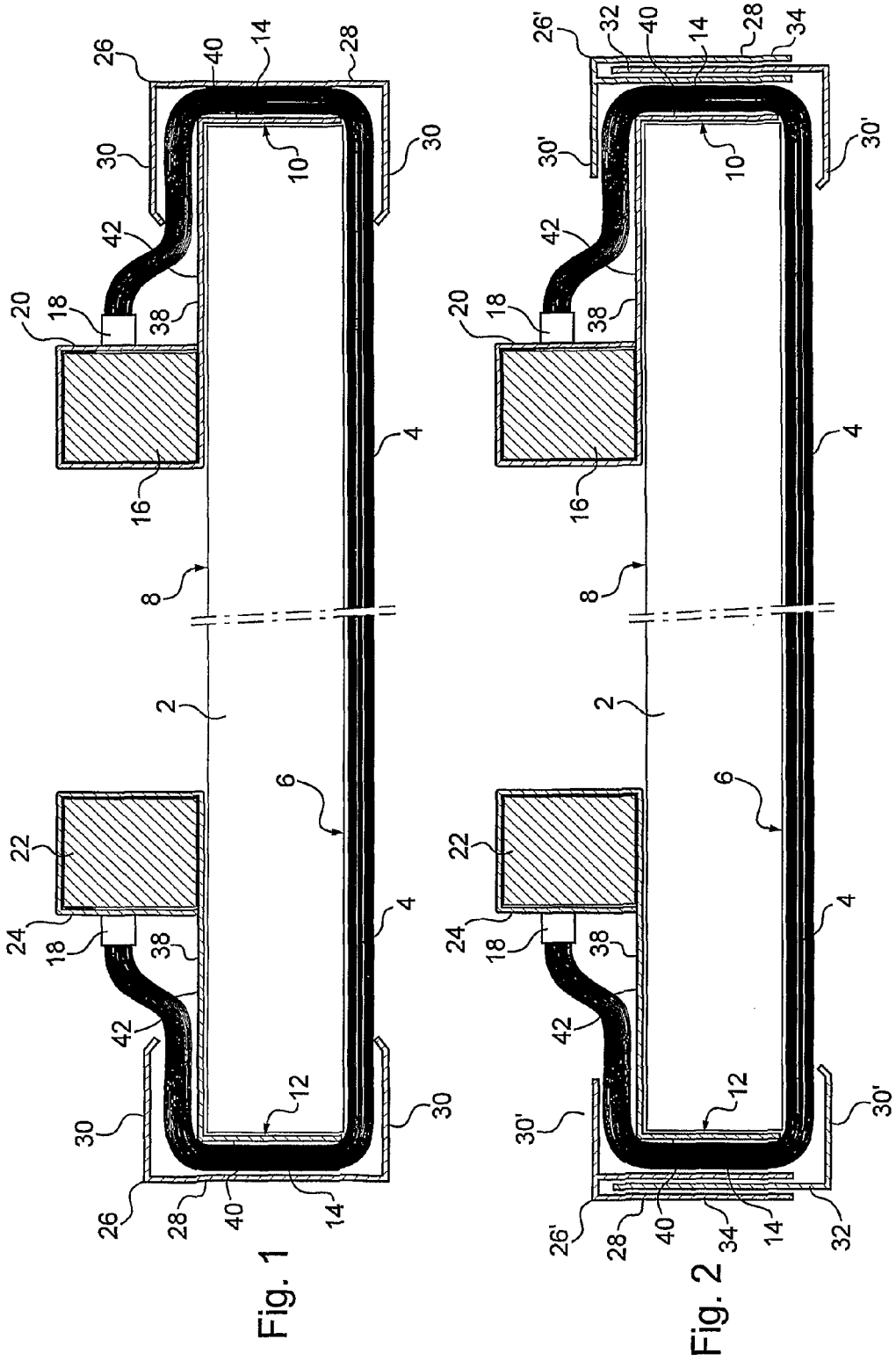

LUMINOUS PLATE

The present invention concerns a luminous board. It concerns more particularly a rigid support, such as a cladding panel, provided with lighting means and that can be used to produce a vertical wall—in the case of an interior wall, for example—or a horizontal wall—for example a ceiling.

It is known to use a woven fabric, known as luminous fabric, to produce a light source stretched and distributed over the whole of a surface, in contrast to the usual light sources which are either point sources (incandescent lamp, halogen lamp, LED, etc.) or linear sources (neon tube, halogen lamp, etc.). A luminous fabric and its weaving method are disclosed in the document FR-2 859 737, for example. The document FR-2 907 194 for its part discloses sticking a luminous fabric onto a rigid support.

The technical problem behind the present invention is providing means making it possible to produce a wall incorporating at least one rigid support associated with a luminous fabric. Here it is a question of incorporating a rigid support covered with a luminous fabric into a horizontal or vertical wall with existing constraints in the construction field.

To this end, the present invention proposes a complex including a rigid support covered with a luminous fabric, in which the rigid support has a front face, a rear face opposite the front face, a first edge, and a second edge opposite the first edge, the luminous fabric at least partly covering the front face of the rigid support, extending from the first edge toward the second edge.

According to the present invention:
the luminous fabric includes optical fibers extending over the front face of the rigid support substantially perpendicular to the first edge and the second edge,
first ends of the optical fibers are bent around the first edge toward the rear face of the rigid support, and
gripping means are provided on the first edge and form a clamp for gripping the bent parts of the optical fibers and the first edge of the rigid support.

Thus the invention provides means making it possible to stretch the luminous fabric over the rigid support. Furthermore, the gripping means used advantageously make it possible additionally to protect the bent ends of the optical fibers.

In an advantageous variant of the invention, second ends of the optical fibers are bent around the second edge toward the rear face of the rigid support and gripping means are provided on the second edge and form a clamp for gripping the bent parts of the optical fibers and the second edge of the rigid support.

In a complex of the invention, the first ends (and possibly also the second ends) of the optical fibers are joined to a casing fixed to the rear face of the rigid support and inside which are light sources.

In a first embodiment of a complex of the invention, the gripping means include, for example, a base joining two substantially parallel elastic arms. In another embodiment the base and the two elastic arms form a one-piece structural section, while in a further embodiment the distance between the two elastic arms can be adjusted and corresponding adjustment means are incorporated in the base.

In a complex of the invention, the luminous fabric is covered with a layer of translucent material. As a result, the fabric is invisible when the corresponding light sources are not switched on and becomes visible only when the light sources light up the luminous fabric.

In such an embodiment the gripping means advantageously also grip the layer of translucent material.

In a complex of the invention, the rigid support is for example a sheet of plasterboard.

Figure 4:
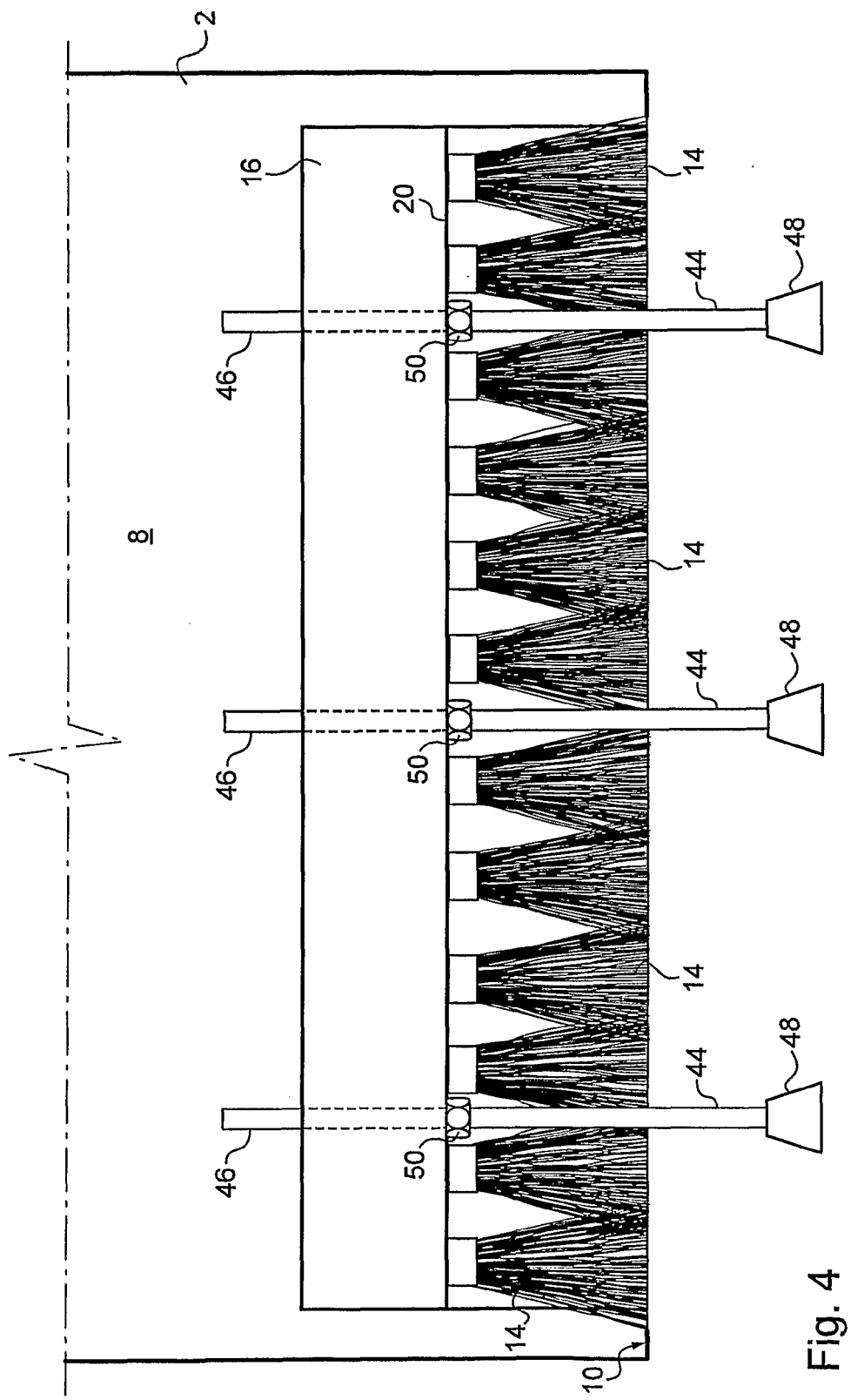

Details and advantages of the present invention will emerge more clearly from the following description, given with reference to the appended diagrammatic drawings, in which:

FIG. 1 shows in side view a luminous board of a first embodiment of the invention, FIG. 2 shows in side view a variant of the board from FIG. 1, FIG. 3 is a view in elevation showing one example of application of a board from FIG. 1 to produce a vertical interior wall, and FIG. 4 is a diagrammatic rear view to a larger scale showing the base of the board from FIG. 3, without the clamp shown in FIG. 3.

FIG. 1 is a side view of a luminous board of the present invention. This board includes a rigid support 2, a luminous fabric 4 and its accessories, and means for mounting the luminous fabric 4 on the rigid support 2.

The rigid support 2 is for example a cladding panel of the type used to produce walls, both horizontal walls (ceilings) and vertical walls (interior walls). It is for example a sheet of plasterboard such as BA13 boards used for interior walls.

This rigid support 2 has two large faces and four edges. One large face is called the front face 6 and the other large face, opposite the front face 6, is called the rear face 8. The following description refers primarily to a first edge 10 and to a second edge 12 opposite the first edge 10.

The luminous fabric 4 covers the front face 6 of the rigid support 2 at least partially. In one embodiment, weft threads of the luminous fabric 4 are optical fibers 14. These project from the surface of the luminous fabric 4 in order for each of them to be connected to a light source (not shown). Alternatively, the optical fibers could be warp threads of the luminous fabric.

In the embodiment shown, first ends of the optical fibers 14 are bent at 180° around the first edge 10 toward the rear face 8 of the rigid support 2 and are connected to light sources behind the rigid support 2. The light sources are disposed in a housing defined within a first casing 16. They are light-emitting diodes (LED), for example. The optical fibers 14 are connected by screw-on connectors 18 of a type known to the person skilled in the art on a bottom plate 20 of the first casing 16.

In a similar way, second ends of the optical fibers 14 are bent at 180° around the second edge 12 toward the rear face 8 of the rigid support 2 and are connected to light sources (not shown) such as LEDs disposed within a housing defined inside a second casing 22. The optical fibers 14 are connected by screw-on connectors 18 to a top plate 24 of the casing 20.

The first casing 16 is produced from a structural section, for example, possibly with a lid. In a preferred embodiment shown in the drawings, it is of elongate parallelepiped shape and parallel to the first edge 10 (and the second edge 12) of the rigid support 2. The second casing 22 is similar to the first casing 16.

The first casing 16 and the second casing 22 are fixed to the rear face 8 of the rigid support 2. They may be fixed by any means, depending in particular on the material from which the rigid support is made. In the case of a rigid support formed by a sheet of plasterboard, sticking the casings onto the rear face 8 of the rigid support 2 may be envisaged, for example.

In the FIG. 1 embodiment, the luminous fabric 4 is stretched over the front face 6 of the rigid support 2 and is kept stretched over this front face 6 by two clamps 26.

In this first embodiment each clamp 26 takes the form of a one-piece structural section having a U-shaped cross section. Thus a clamp 26 has a base 28 and two branches 30.

The base 28 is plane, for example, and faces the first edge 10 or the second edge 12 of the rigid support 2 over substantially all of the length of the corresponding edge. The branches 30 are joined to the base 28 so that they can move away from each other elastically. The free edges of the branches 30 are bent slightly toward the opposite branch 30, thus forming a clamp.

The clamp 26 is configured so that when it is not stressed the distance between the slightly bent free edges of the branches 30 is less than the sum of the thickness of the rigid support 2 and the thickness of the luminous fabric 4 and the optical fibers 14. Thus to fit a clamp 26 as shown in FIG. 1, it is necessary to spread its branches 30, which thereafter clamp the luminous fabric 4 onto the rigid support 2. The clamp 26 grips the corresponding edge of the rigid support 2, clamping the luminous fabric 4 onto the rigid support 2. Because of its shape, the clamp 26 also protects the part of the optical fibers 14 bent at 180°.

FIG. 2 shows a variant of a rigid support/luminous fabric complex of the present invention. This complex has the same structure as that from FIG. 1. However, the one-piece clamp 26 from FIG. 1 is here replaced by a two-part clamp 26'.

The clamp 26' repeats the structure of the clamp 26, having a base and two branches 30'. Each of the branches 30' is intended to bear against one face of the rigid support 2, clamping onto this face the luminous fabric 4 or the optical fibers 14.

The base of the clamp 26' enables the distance between the two branches 30' to be adjusted. A first branch 30' is provided with a male member 32 while the other branch 30' is provided with a female member 34 in which the male member 32 can slide. For example, gripping means (not shown) are provided to hold the male member 32 in a given position ensuring effective clamping of the luminous fabric 4 onto the front face 6 of the rigid support 2 relative to the female member 34.

A complex formed of a rigid support 2 and a luminous fabric 4 as shown in FIGS. 1 and 2 may be used as shown to produce a ceiling. Such a complex may rest on a structure produced under a floor to receive cladding panels known as ceiling tiles. Here it suffices to adapt the size of the rigid support 2 to the dimensions of the structure, allowing for the clamps 26 or 26'.

FIG. 3 shows how a complex shown in FIG. 1 may also be adapted to produce a vertical wall, for example an interior wall. The following description is also valid for a complex as that from FIG. 2 and even other complexes incorporating a rigid support 2 and a luminous fabric 4, for example with the luminous fabric 4 stuck to the rigid support 2. Similarly, FIG. 3 shows a complex of the invention equipping only one side of the interior wall. It is equally possible, notably by adapting the casings containing the light sources, to provide a complex of the invention on two faces of the same interior wall.

In the embodiment represented in FIG. 3, the interior wall shown diagrammatically uses structural sections such as those known to the person skilled in the art to produce demountable interior walls. Such interior walls include for example interior walls known as stud walls marketed under the trade mark Clipper. The following description indicates how one face of such an interior wall may be rendered at least partially luminous, for example using a complex shown in FIG. 1.

Conventionally, an interior wall of this kind includes a bottom rail 36, a top rail, not shown, vertical uprights, not shown, and rigid supports 2, for example BA13 plasterboard sheets.

In the embodiment shown in the drawing, a rigid support 2 is covered on its front face 6 with a luminous fabric 4. The first casing 16 and the second casing 22 are each fastened to an angle-iron 38. The latter has two flanges: a first flange 40 covers the corresponding edge of the rigid support 2. For its part, the second flange 42 joins the corresponding casing to the corresponding first flange 40 and extends along the rear face of the rigid support 2. When the complex shown in FIG. 1 is placed vertically to produce an interior wall, as shown in FIG. 3, the first edge 10 is placed horizontally at the bottom and the second edge 10 then becomes the top edge of the rigid support. Thus the first flange 40 of the angle-iron 38 corresponding to the first casing 16 serves as a support for the rigid support 2 and the first or bottom edge 10 of the rigid support 2 comes to rest on this first flange 40.

As shown in the figures, especially FIGS. 3 and 4, the first casing 16 is carried by feet 44. Each foot 44 includes a threaded rod 46 passing through the first casing 16 and a bearing base 48. A nut 50 bearing on the bottom plate 20 of the first casing 16 enables the feet 44 to support the first casing 16. This beam being fastened to its angle-iron 38, the first flange 40 of which supports the corresponding rigid support 2, the feet 44 thus support the combination of the rigid support 2 and the first casing 16 containing the light sources. As may be seen in the drawings, if the optical fibers 14 are bent around the first or bottom edge 10 of the rigid support 2, they pass out of the angle-iron 38 (and not between the angle iron and the rigid support). As a result, the assembly produced in this way allows free mounting of the optical fibers 14 without loading them with the weight of the rigid support 2 in particular. Furthermore, as already mentioned, the clamp 26 also protects the optical fibers 14, more particularly the part bent at 180° of the ends of the optical fibers 14.

The bearing bases 48 of the feet 44 rest on the inside of the bottom rail 36.

To supply power to the light sources in the first casing 16 and the second casing 22, a transformer that is not shown is provided. The same transformer may be used for the first casing 16 and the second casing 22. Having a separate transformer for each casing may also be envisaged. In the latter case, a transformer may be incorporated into each casing, for example. In both cases, the transformer or each transformer may be placed between the two rigid supports forming the interior wall shown. Each transformer must be supplied with electrical energy. This is achieved by means of a wire inside the bottom rail 36, for example.

In a preferred embodiment, the first casing 16 and the second casing 22 have dimensions such that each can serve as a spreader between the two rigid supports of the interior wall. The rigid support 2 carrying no luminous fabric then comes to bear against the first casing 16 and the second casing 22. Thus the two rigid supports 2 are held in position on the one hand by the first casing 16 and the second casing 22 and on the other hand by the rails of the interior wall.

The embodiments shown in the drawings provide for light sources to be used at each end of the optical fibers 14. Thus the optical fibers of the luminous fabric 4 are fed with light from both ends. This enables a substantially uniform distribution of light over the whole of the surface of the fabric by eliminating attenuation that could otherwise occur at the ends of the optical fibers far from the light sources.

As a function of the height of the interior wall, and notably the height covered by the luminous fabric 4, and in the case of ceiling tiles, for example, having only one casing with light sources may be envisaged if this height is less. In this case, there is no utility in having the optical fibers 14 project on both opposite edges of the luminous fabric 4. On the side where the optical fibers 14 do not project, and are therefore not bent, use of a clamp 26, 26' or the like may not be necessary. Other fixings may then be used to fix the corresponding edge of the luminous fabric 4 to the front face 6 of the rigid support 2. A clamp 26, 26' or similar gripping means are provided only on the side where the optical fibers 14 are bent toward the rear of the rigid support 2.

The luminous fabric 4 may form a large luminous area distributed over the whole of the front face 6 of the rigid support. Nevertheless, in some cases, only part of the luminous fabric is lit up when the light sources are switched on. Having light appear only over part of the luminous fabric to represent a drawing, a logo, information, etc. may be envisaged. In this case, to render the pattern intended to be illuminated invisible when the light sources are turned off, it is proposed to cover the luminous fabric 4 with a translucent layer. This may be a layer of paper, for example, the color of which corresponds to the color of the luminous fabric. It may equally be a sheet of synthetic material that diffuses light. Other materials may be envisaged, for example a thin fabric.

The various embodiments described above make it possible to provide a complex incorporating a rigid support and a luminous textile that may be used as cladding to produce vertical or horizontal walls, interior walls and ceilings. The solution proposed above has the advantage that it can be incorporated into a "standard" framework system for an interior wall or a ceiling. This facilitates fitting and limits cost.

Using such a system also makes it possible to produce a demountable assembly enabling maintenance of the components associated with the luminous fabric. Panels incorporating a luminous fabric may be demounted in exactly the same way as prior art "basic" cladding panels, which may be combined with complexes according to the present invention to produce a ceiling or an interior wall.

The complex of the invention makes it possible to protect the optical fibers where they are most fragile, i.e. in the area where they are bent. Furthermore, the proposed assembly for producing an interior wall makes it possible to prevent them from being loaded mechanically, notably by the weight of the resulting cladding panel.

In the case of use to produce an interior wall, the casings used to accommodate the light sources make it possible, on the one hand, in the case of the casing disposed at the bottom, to support the corresponding rigid support and, on the other hand, to produce the spacing from another rigid support forming the interior wall.

The present invention is not limited to the embodiments and the variants thereof described above by way of nonlimiting example. It equally concerns all variants evident to the person skilled in the art within the scope of the following claims.

Thus using a luminous fabric of a type different from that described above is not outside the scope of the invention. The support for this fabric may equally be different from a sheet of plasterboard. Any rigid support able to be integrated into the production of an interior wall, for example a melamine-faced panel, could also be suitable.

The above description relates in particular to an interior wall framework sold under the trade mark Clipper. However, the invention applies equally to other frameworks, and preferably demountable and/or removable interior wall frameworks.

The embodiments of the gripping means are also provided by way of illustrative and nonlimiting example. Thus instead of having a structural section extending over substantially all of the corresponding edge of the rigid support, for example, employing a number of smaller gripping devices distributed along the edge of the rigid support to retain the luminous fabric may be envisaged.

The invention claimed is:

1. A construction panel, comprising:
   a rigid panel (2) that is a construction element of one of a wall and a ceiling, the rigid panel having a front face (6), a rear face (8) opposite the front face (6), a first edge (10), and a second edge (12) opposite the first edge;
   a luminous fabric (4) at least partly covering the front face (6) of the rigid panel (2), extending from the first edge (10) toward the second edge (12), the luminous fabric (4) including optical fibers (14) extending over the front face (6) of the rigid panel (2) substantially perpendicular to the first edge (10) and the second edge (12), wherein first ends of the optical fibers (14) are bent around the first edge (10) toward the rear face (8) of the rigid panel (2); and
   gripping means (26, 26') on the first edge (10) forming a clamp for gripping the bent parts of the optical fibers (14) and the first edge (10) of the rigid panel (2).

2. The construction panel according to claim 1, wherein second ends of the optical fibers (14) are bent around the second edge (12) toward the rear face (8) of the rigid panel (2) and said gripping means (26, 26') are provided on the second edge (12) and form a clamp for gripping the bent parts of the optical fibers (14) and the second edge (12) of the rigid panel (2).

3. The construction panel according to claim 1, wherein the first ends of the optical fibers (14) are connected to a casing (16) fixed to the rear face (8) of the rigid panel (2) and inside which are light sources.

4. The construction panel according to claim 2, wherein the second ends of the optical fibers (14) are connected to a casing (22) fixed to the rear face (8) of the rigid panel (2) and inside which are light sources.

5. The construction panel according to claim 1, wherein the gripping means (26, 26') include a base (28) joining two substantially parallel elastic arms (30, 30').

6. The construction panel according to claim 5, wherein the base (28) and the two elastic arms (30) form a one-piece structural section.

7. The construction panel according to claim 5, wherein the distance between the two elastic arms (30') can be adjusted and the base (28) incorporates corresponding adjustment means.

8. The construction panel according to claim 1, wherein the luminous fabric (4) is covered with a layer of translucent material.

9. The construction panel according to claim 8, wherein the gripping means (26, 26') also grip the layer of translucent material.

10. The construction panel according to claim 1, wherein the rigid support (2) is a sheet of plasterboard.

11. The construction panel according to claim 2, wherein the first ends of the optical fibers (14) are connected to a casing (16) fixed to the rear face (8) of the rigid panel (2) and inside which are light sources.

12. The construction panel Complex according to claim 2, wherein the gripping means (26, 26') include a base (28) joining two substantially parallel elastic arms (30, 30').

13. The construction panel according to claim 3, wherein the gripping means (26, 26') include a base (28) joining two substantially parallel elastic arms (30, 30').

14. The construction panel according to claim 4, wherein the gripping means (26, 26') include a base (28) joining two substantially parallel elastic arms (30, 30').

15. The construction panel Complex according to claim 2, wherein the luminous fabric (4) is covered with a layer of translucent material.

16. The construction panel according to claim 3, wherein the luminous fabric (4) is covered with a layer of translucent material.

17. The construction panel according to claim 4, wherein the luminous fabric (4) is covered with a layer of translucent material.

18. The construction panel according to claim 5, wherein the rigid panel is a cladding panel.

19. A vertical interior wall comprising the construction panel of claim 1.

20. A ceiling comprising the construction panel of claim 1.

* * * * *

UNITED STATES PATENT AND TRADEMARK OFFICE
CERTIFICATE OF CORRECTION

PATENT NO. : 8,534,891 B2  Page 1 of 1
APPLICATION NO. : 13/129548
DATED : September 17, 2013
INVENTOR(S) : Perez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 38 days.

Signed and Sealed this

Fifteenth Day of September, 2015

Michelle K. Lee
*Director of the United States Patent and Trademark Office*